United States Patent [19]

Zawacky et al.

[11] Patent Number: 5,530,043
[45] Date of Patent: Jun. 25, 1996

[54] LOW VOLATILE ORGANIC CONTENT PIGMENT GRIND COMPOSITION

[75] Inventors: Steven R. Zawacky, Pittsburgh; Jeffrey G. Koren, Clinton Township, Butler County; Mark L. Follet, Gibsonia; Patricia A. Aikens, Rosemont Township, Delaware County, all of Pa.

[73] Assignee: PPG Industries, Inc., Pittsburgh, Pa.

[21] Appl. No.: 249,007

[22] Filed: May 25, 1994

[51] Int. Cl.$^6$ .................... C08J 3/20; C08K 5/10; C08L 33/08
[52] U.S. Cl. ............... 524/317; 524/308; 524/377; 524/378
[58] Field of Search .................... 524/308, 317, 524/377, 378

[56] References Cited

U.S. PATENT DOCUMENTS

| | | | |
|---|---|---|---|
| 3,455,806 | 7/1969 | Spoor | 204/181 |
| 3,701,746 | 10/1972 | Johnson | 524/317 |
| 3,749,657 | 7/1973 | Le Bras et al. | 204/181 |
| 3,919,152 | 11/1975 | Krupp et al. | 260/294 UA |
| 3,928,157 | 12/1975 | Suematsu | 204/181 |
| 4,093,666 | 6/1978 | Arpe | 260/615 A |
| 4,104,100 | 8/1978 | Anders et al. | 204/181.4 |
| 4,133,791 | 1/1979 | Kemenator | 524/377 |
| 4,302,560 | 11/1981 | Becher et al. | 525/327 |
| 4,512,861 | 4/1985 | Doroszkoski | 204/181.4 |
| 4,605,690 | 8/1986 | Debroy et al. | 523/414 |
| 4,666,970 | 5/1987 | Zwack et al. | 524/399 |
| 4,687,789 | 8/1987 | Gonnet | 524/377 |
| 4,891,111 | 1/1990 | McCollum et al. | 204/181.7 |
| 5,045,587 | 9/1991 | Tanaka | 524/308 |
| 5,074,979 | 12/1991 | Valko et al. | 204/181.7 |
| 5,084,505 | 1/1992 | Biale | 524/317 |
| 5,098,478 | 3/1992 | Krishman | 524/377 |
| 5,169,894 | 12/1992 | Holland | 524/377 |
| 5,194,547 | 3/1993 | Ohashi | 526/266 |
| 5,260,135 | 11/1993 | Corrigan et al. | 428/416 |
| 5,284,894 | 2/1994 | Wasyliw | 524/377 |
| 5,324,764 | 6/1994 | Fujita | 524/377 |

FOREIGN PATENT DOCUMENTS 0576943  6/1993  European Pat. Off. .

OTHER PUBLICATIONS

MAPEG® 400 ML PEG (400) Monolaurate, Technical Bulletin, rev. 01 Dec. 1993.
MAPEG® 300 MOT PEG Fatty Acid Ester, Technical Bulletin, rev. 01 Dec. 1993.
MAPEG® 200 ML PEG (200) Monolaurate, Technical Bulletin, rev. 01 Dec. 1993.
MACOL® TD 3 POE 93) Tridecyl Ether, Technical Bulletin, rev. 01 Dec. 1993.
MAPEG® 400 MS PEG (400) Monostearate, Tecnical Bulletin, rev. 01 Dec. 1993.
MACOL® SA 2 POE (2) Stearyl Ether, Technical Bulletin, rev. 01 Dec. 1993.
MACOL® LA 4 Lauryl Alcohol Polyether, Technical Bulletin, rev. 01 Dec. 1993.
MACOL® OP 5 POE (5) Octyl Phonol, Technical Bulletin, rev. 01 Dec. 1993.
MACOL® SA 5 POE (5) Stearyl Ether, Technical Bulletin, rev. 01 Dec. 1993.
MACOL® OP 3 POE (3) Octyl Phenol, Technical Bulletin, rev. 01 Dec. 1993.

Primary Examiner—Paul R. Michl
Assistant Examiner—U. K. Rajguru
Attorney, Agent, or Firm—Linda Pingitore; Dennis G. Millman

[57] ABSTRACT

A pigment grind composition contains pigment, water dispersible acrylic polymer and a reactive diluent. The reactive diluent has a number average molecular weight of between about 200 and about 2500 and is selected from polyalkylene glycols, polyalkylene glycol ethers, glycol ether formals or mixtures of these. The pigment grind composition has a volatile organic content of less than two pounds per gallon.

17 Claims, No Drawings

LOW VOLATILE ORGANIC CONTENT PIGMENT GRIND COMPOSITION

BACKGROUND OF THE INVENTION

The present invention relates to pigment grind compositions.

Coating compositions which are pigmented generally incorporate the pigment component by blending pigment, dispersing agent or grind vehicle and other optional additives together with organic solvent into a paste which is then blended with a major portion of the film forming vehicle to produce the final coating composition. Depending upon the particular pigment, that is whether it is organic or inorganic, and the dispersing agent or grind vehicle for the pigment, preparation of the pigment grind composition may require excessive amounts of organic solvent to incorporate and adequately disperse the pigment. This could raise environmental concerns over volatile solvent emissions. Moreover, certain pigments are not as readily incorporated, necessitating the use of a particularly tailored vehicle for each type of pigment and, in addition, inordinately long grinding periods may be required, thus increasing cost and decreasing production efficiency.

There is a need, therefore, for a pigment grind composition which is versatile not only in its ability to incorporate a variety of pigments quickly and effectively, but also which produces minimal volatile organic solvent emissions.

SUMMARY OF INVENTION

In accordance with the present invention there is provided a pigment grind composition having a volatile organic content of less than two pounds per gallon comprising a pigment, water dispersible acrylic polymer and a reactive diluent. The reactive diluent has a number average molecular weight of between about 200 and about 2500 and is selected from the group consisting of polyalkylene glycols, polyalkylene glycol esters, glycol ether formals and mixtures thereof.

DETAILED DESCRIPTION OF THE INVENTION

The pigment grind compositions of the present invention contain pigment, a water dispersible acrylic polymer as the grind vehicle and a reactive diluent. "Water dispersible" herein means adapted to be solubilized, dispersed or emulsified in water. That is, polymers which can be classified, depending upon their dispersed state, as solution polymers, dispersion polymers or suspension polymers are all suitable for use herein.

The claimed pigment grind compositions can be used in a variety of coating applications but are especially preferred in formulating electrocoating compositions for use in electrodeposition. The compositions can be used in both anodic and cathodic electrocoat compositions, although anodic electrocoat compositions are preferred. For such applications, the water dispersible acrylic polymer should be electrodepositable as is well known to those skilled in the art. Briefly, that is, an electrodepositable polymer is ionic in nature. Depending upon the particular method of electrodeposition, the polymer will contain anionic functional groups to impart a negative charge (anodic electrodeposition) or cationic functional groups to impart a positive charge (cathodic electrodeposition), the respective functional groups being appropriately neutralized with base or acid to solubilize the polymer in water.

The use of a reactive diluent reduces the need for volatile organic solvents to control viscosity, thus producing a pigment grind composition of low volatile organic content (VOC). The VOC of the pigment grind compositions of the present invention is generally less than 2.0 pounds per gallon, preferably less than 1.5 pounds per gallon, more preferably less than 1.0 pounds per gallon, most preferably less than 0.5 pounds per gallon.

The reactive diluent can be incorporated into the pigment grind composition of the present invention by simply blending it with the water-dispersible acrylic polymer and then incorporating the pigment. Preferably, the water-dispersible acrylic polymer is polymerized in the presence of the reactive diluent and then pigment is incorporated.

Suitable reactive diluents for use in the present invention have a number average molecular weight of between about 200 and about 2500, preferably between about 250 and about 1000, more preferably between about 300 and about 800, as determined by gel permeation chromatography (GPC) using polystyrene as a standard. The diluent is selected from the group consisting of polyalkylene glycols, polyalkylene glycol esters, glycol ether formals, and mixtures thereof. Preferably the reactive diluent is a polyalkylene glycol, polyalkylene glycol ester, or mixture thereof.

Examples of polyalkylene glycols useful in the present invention include polypropylene glycol, polyethylene glycol, and polybutylene glycol. For electrocoating applications, polypropylene glycol is the preferred polyalkylene glycol since it has limited solubility in water, enhancing the electrocoatability of electrocoat compositions incorporating the pigment grind composition. If desired, suitable materials can be commercially obtained and include the ARCOL® brand series of materials commercially available from Arco Chemical Co. and the NIAX® brand series of materials commercially available from Union Carbide.

Examples of polyalkylene glycol esters include polyethylene glycol esters and polypropylene glycol esters. Examples of such esters include mono and di esters formed by the reaction of either polyethylene glycol or polypropylene glycol with a monocarboxylic acid having from 1 to 18 carbon atoms, preferably 8 to 12 carbon atoms. Suitable monocarboxylic acids used to prepare include caprylic, capric, laurie, myristic, palmitic, stearic, oleic, linoleic, and linolenic acid. Again, if desired, suitable materials can be commercially obtained and include the MAPEG® brand series of materials commercially available from PPG Industries, Inc., Specialties Chemicals, Chemicals Group, as well as the PEG® brand series of materials commercially available from Henkel Corporation. Preferably the polyalkylene glycol ester is polyethylene glycol monolaurate, for example, MAPEG® 400 ML or PEG® 400 Monolaurate.

Suitable glycol ether formals can be formed by the reaction of formaldehyde and a glycol ether. Examples of glycol ethers useful for practicing the present invention include diethylene glycol monobutyl ether, diethylene glycol monohexyl ether, ethylene glycol monobutyl ether, and ethylene glycol monohexyl ether. Preferably the glycol ether formal is formed by the reaction of formaldehyde and diethylene glycol monobutyl ether. Although one skilled in the art readily appreciates the manner of preparing the aforesaid glycol ether formals, reference is made to U.S. Pat. No. 4,891,111, column 3, lines 14 to 42, incorporated by reference herein, for a more detailed discussion.

The water-dispersible acrylic polymer which is used as the grind vehicle is prepared from a vinyl monomer component. Typically the acrylic polymer is a copolymer of one or more alkyl esters of acrylic acid or methacrylic acid optionally together with one or more other polymerizable ethylenically unsaturated monomers. Suitable alkyl esters of acrylic acid or methacrylic acid include ethyl acrylate, n-butyl acrylate, 2-ethylhexyl acrylate, methyl methacrylate, ethyl methacrylate, and n-butyl methacrylate. Suitable other copolymerizable ethylenically unsaturated monomers include vinyl aromatic compounds such as styrene and vinyl toluene; nitriles such as acrylonitrile and methacrylonitrile; vinyl and vinylidene halides such as vinyl chloride and vinylidene fluoride and vinyl esters such as vinyl acetate. Additionally suitable ethylenically unsaturated monomers are functional monomers including acrylic acid, methacrylic acid, and hydroxyl functional acrylates and methacrylates such as hydroxyethyl acrylate, hydroxyethyl methacrylate, hydroxypropyl acrylate, and hydroxypropyl methacrylate.

A preferred polymer is prepared from about 15 percent to about 35 percent of a vinyl aromatic monomer, preferably styrene; from about 40 percent to about 60 percent of an alkyl acrylate, preferably n-butyl acrylate; from about 5 percent to about 20 percent of a hydroxyl functional vinyl monomer, preferably hydroxy ethyl acrylate; and from about 8 percent to about 15 percent of acid functional monomer, preferably methacrylic acid. Although optional, up to about 2 percent of 2-acrylamido-2-methylpropanesulfonic acid (commercially available as AMPS® monomer from Lubrizol Corporation) is preferably added to introduce sulfonic acid functionality which has been observed to improve cure response in aminoplast cured coating compositions prepared with the claimed pigment grind composition.

The water-dispersible acrylic polymer is typically prepared by solution polymerization techniques, known to those skilled in the art. Generally the vinyl monomer component is polymerized in the presence of a suitable free radical initiating catalyst such as organic peroxides or azo compounds, for example benzoyl peroxide, t-butyl perbenzoate, or N,N'-azobis-(isobutyronitrile). The amount of catalyst can vary widely depending upon the particular polymerization conditions, although usually, from about 0.5 percent to about 3 percent is used. In a preferred embodiment of the present invention the vinyl monomer component is also polymerized in the presence of the reactive diluent as described in detail above with only a minor amount of organic solvent exemplified by alcohols including isopropanol, isobutanol, and n-butanol, preferably isobutanol; aromatic solvents such as xylene and toluene; ketones such as methyl amyl ketone; and glycol ethers such as ethylene glycol monobutyl ether and ethylene glycol monohexyl ether. The solvent is selected such that it solubilizes the monomers and can be readily removed by distillation at the completion of the polymerization. The completion of the polymerization is determined based on the half-life of the particular free radical initiating catalyst chosen, as is well understood by those skilled in the art.

Rather than polymerizing the vinyl monomer component in the presence of the aforesaid reactive diluent, alternatively, after polymerization of the water dispersible acrylic polymer is complete, the reactive diluent can be added to the acrylic polymer to reduce viscosity. Pigment is then incorporated as described below. If desired, organic solvent introduced during polymerization of the acrylic polymer can be removed by stripping to reduce volatile organic content.

The water dispersible acrylic polymer (grind vehicle) is preferably a base neutralized carboxylic acid functional polymer. The polymer is typically prepared as described above having an acid value ranging from about 12 to about 130 (mg KOH/gram of polymer), preferably from about 50 to about 90, as determined by conventional potentiometric titration techniques. The polymer is dispersed in water by neutralization with a suitable base such as for example diisopropanol amine which is preferred, diethanol amine, ammonia and triisopropanol amine.

The aforesaid acrylic polymer generally has a number average molecular weight ranging from about 1000 to about 15,000, preferably from about 1000 to about 8000, as determined by GPC using polystyrene as a standard.

Suitable pigments for use in the present invention can be any of the conventional inorganic types including, for example, iron oxides, lead oxides, strontium chromate, carbon black, coal dust, titanium dioxide, talc, barium sulfate, as well as color pigments such as cadmium yellow, cadmium red, chromium yellow and the like. In addition organic pigments such as napthol red, pthalocyanine blue or green, or quinacridone red can be used. Moreover, mixtures of organic and inorganic pigments can be used.

Irrespective of whether the acrylic grind vehicle is prepared by polymerization in the presence of the reactive diluent or the reactive diluent is post added to the grind vehicle, as detailed above, dispersion of the pigment is accomplished by the use of a pigment grinding mill such as a sand mill, ball mill or roller mill according to well known techniques.

The pigment is combined with the grind vehicle and neutralizing base in an aqueous medium under agitation and subsequently ground using grind media for a period of time ranging from about 30 minutes to about 90 minutes, preferably about one hour, and at a temperature of about 35° C. to about 55° C., typically to a Hegman grind ranging from about 5 to about 7, preferably to a grind of about 7. It should be understood that any desired Hegman grind can be obtained. Suitable grind media include ceramic beads, glass beads or metallic beads. Ordinary tap water can be used as the aqueous medium, but deionized water is preferred, generally having a conductivity of less than about 15 micromhos. Optionally there can be present various additives such as surfactants, wetting agents and the like which are typically combined and milled along with the pigment and vehicle as described above.

In the practice of the present invention the pigment content of the composition is usually expressed as the pigment-to-binder ratio. This generally ranges from about 1:1 to about 10:1, preferably about 1:1 to about 6:1. The other additives mentioned above are usually present in amounts ranging from about 0.1 percent to about 3 percent by weight, the percentages based on the total weight of resin solids of the pigment grind composition.

The pigment grind compositions of the present invention are particularly advantageous in that they have a low volatile organic content, as mentioned previously, which minimizes environmental concerns over solvent emissions. Moreover, the compositions are versatile in that a variety of organic, inorganic and mixtures of these pigments can be ground quickly and efficiently, typically in about an hour. Even pigments which are characteristically difficult to grind such as transparent yellow iron oxide and transparent red iron oxide, can be readily processed. The pigment grind compositions are also useful in preparing tint pastes which are used to modify the color of other pigment grind compositions. In addition, the claimed pigment grind compositions can contribute to improved film build, flow and coalescence in electrocoating compositions to which they are preferably added.

The invention will be described further in conjunction with several examples showing the method and practice of the invention. These examples, however, are not to be construed as limiting the invention to their details. All parts and percentages in the examples as well as throughout the specification are by weight unless otherwise indicated.

EXAMPLES

The following examples illustrate pigment grind compositions according to the present invention. The examples demonstrate the versatility of the claimed pigment grind compositions in that inorganic pigments as well as a mixture of organic and inorganic pigments were used. Moreover, in all the examples the pigments were quickly and thoroughly ground in about one hour. All the pigment grind compositions shown below had a volatile organic content of less than about 0.5 pounds per gallon.

Deionized water when utilized in all of the following examples had a conductivity of less than about 15 micromhos.

Water Dispersible Acrylic Polymers (Acrylic Grind Vehicles)

Example A

This example shows the preparation of an acrylic grind vehicle in the presence of a polyethylene glycol monoester as reactive diluent. The grind vehicle was prepared from the following mixture of ingredients:

| Ingredients | Parts by Weight |
| --- | --- |
| Charge I | |
| n-Butanol | 146.7 |
| PEG 400 ® Monolaurate[1] | 948.6 |
| Charge II | |
| Styrene | 458.8 |
| Methacrylic Acid | 223.2 |
| Butyl Acrylate | 904.6 |
| Hydroxyethyl Acrylate | 177.3 |
| Tertiary Dodecyl Mercaptan | 105.4 |
| n-Butanol | 93.0 |
| Tertiary Butyl Perbenzoate | 40.3 |
| Charge III | |
| n-Butanol | 124.0 |
| Diisopropanol Amine | 0.8 |
| AMPS ® Monomer[2] | 1.2 |
| Charge IV | |
| n-Butanol | 12.4 |
| Tertiary Butyl Perbenzoate | 2.1 |
| Charge V | |
| n-Butanol | 5.5 |
| Tertiary Butyl Perbenzoate | 3.2 |

[1]Polyethylene Glycol 400 monolaurate commercially available from Henkel Corp.
[2]2-Acrylamido-2-methylpropanesulfonic acid commercially available from Lubrizol Corp.

The first portion of the n-butanol and the PEG 400 monolaurate diluent (Charge I) were charged to a reaction vessel and heated to 125° C. under nitrogen. The styrene, methacrylic acid, butyl acrylate, hydroxyethyl acrylate, tertiary dodecyl mercaptan, second portion of n-butanol and first portion of tertiary butyl perbenzoate (Charge II) were charged to an erlenmeyer flask and mixed well. The third portion of n-butanol, diisopropanol amine and AMPS monomer (Charge III) were charged to a second erlenmeyer flask and mixed well until all the AMPS monomer had dissolved. Both monomer mixtures were added dropwise as separate feeds to the hot n-butanol and PEG 400 monolaurate diluent mixture in the reaction vessel over a three hour period while maintaining a 123° to 128° C. reaction temperature.

Upon completion of the additions, the mixture in the reaction vessel was held for half an hour at 123° to 128° C. The second portion of tertiary butyl perbenzoate was then added dropwise over 10 minutes as a solution in the forth portion of n-butanol (Charge IV). Upon completion of the scavanger addition, the reaction mixture was held at 123° to 128° C. for an hour whereupon the third portion of tertiary butyl perbenzoate was added dropwise over 10 minutes as a solution in the fifth portion of n-butanol (Charge V). After the second scavenger charge had been added, the reaction mixture was held an additional hour at 123° to 128° C.

Upon completion of the scavanger holds, the mixture in the reaction vessel was maintained at 123° to 128° C. and the pressure was gradually reduced over the course of an hour while 372 parts by weight of distillate were collected. The stripped mixture was then cooled to give a finished anionic acrylic grind vehicle ready for use as described below.

Example B

This example shows the preparation of an acrylic grind vehicle in the presence of a polypropylene glycol as a reactive diluent. The grind vehicle was prepared from the following mixture of ingredients:

| Ingredients | Parts by Weight |
| --- | --- |
| Charge I | |
| DOWANRL ® PM[1] | 29.5 |
| ARCOL ® Polyol PPG-2025[2] | 162.0 |
| Deionized Water | 8.0 |
| Charge II | |
| Styrene | 177.4 |
| Methacrylic Acid | 51.6 |
| Butyl Acrylate | 348.3 |
| Hydroxyethyl Acrylate | 67.7 |
| Tertiary Dodecyl Mercaptan | 20.7 |
| ARCOL Polyol PPG-2025 | 25.4 |
| Tertiary Butyl Perbenzoate | 5.9 |
| Charge III | |
| DOWANOL PM | 29.6 |
| Deionized Water | 3.4 |
| Diisopropanol Amine | 1.7 |
| AMPS Monomer | 3.2 |
| Charge IV | |
| ARCOL Polyol PPG-2025 | 4.3 |
| Tertiary Butyl Perbenzoate | 3.1 |
| Charge V | |
| Deionized Water | 50.0 |
| Diisopropanol amine | 59.4 |

[1]Propylene Glycol Methyl Ether commercially available from Dow Chemical Co.
[2]Polypropylene Glycol 2025 commercially available from Arco Chemical Co.

The first portions of the DOWANOL PM, deionized water and the PPG-2025 diluent (Charge I) were charged to a reaction vessel and heated to 100° C. under nitrogen. The styrene, methacrylic acid, butyl acrylate, hydroxyethyl acrylate, tertiary dodecyl mercaptan, second portion of PPG-2025 diluent and first portion of tertiary butyl perbenzoate (Charge II) were charged to an erlenmeyer flask and mixed well. The second portions of DOWANOL PM and deionized water, the first portion of diisopropanol amine and AMPS monomer (Charge III) were charged to a second erlenmeyer flask and mixed well until all the AMPS monomer had dissolved. Both monomer mixtures were added dropwise as separate feeds to the hot DOWANOL PM, deionized water and PPG-2025 diluent mixture in the reaction vessel over a three hour period while maintaining a gentle reflux.

Upon completion of the additions, the mixture in the reaction vessel had attained at temperature of 115° C. and was held for half an hour at that temperature. Half of a mixture of the second portion of tertiary butyl perbenzoate and the third portion of the PPG-2025 diluent (Charge IV) was then added dropwise over 5 minutes. Upon completion of the first scavanger addition, the reaction mixture was held at 115° to 120° C. for an hour. Likewise the second half of the scavanger was added over 5 minutes and the hour hold at 115° to 120° C. was repeated.

After completion of the scavanger holds, the third portion of deionized water (Charge V) was added dropwise to the mixture in the reaction vessel and the mixture reheated to 125° C. for an hour while 89 parts of distillate were collected. The mixture was then cooled to 90° C. and the second portion of diisopropanol amine (Charge VI) was added. The stripped and neutralized mixture was then cooled further to give a finished anionic acrylic grind vehicle ready for use as described below.

Example C

This example shows the preparation of an acrylic grind vehicle in the presence of a glycol ether formal as reactive diluent. The grind vehicle was prepared from the following mixture of ingredients:

| Ingredients | Parts by Weight |
|---|---|
| Charge I | |
| DOWANOL PM | 98.2 |
| 2-(2-Butoxyethoxy)ethanol formal[1] | 539.8 |
| Deionized Water | 26.6 |
| Charge II | |
| Styrene | 591.3 |
| Methacrylic Acid | 172.0 |
| Butyl Acrylate | 1161.0 |
| Hydroxyethyl Acrylate | 225.8 |
| Tertiary Dodecyl Mercaptan | 69.1 |
| 2-(2-Butoxyethoxy)ethanol formal | 84.5 |
| Tertiary Butyl Perbenzoate | 19.8 |
| Charge III | |
| DOWANOL PM | 98.6 |
| Deionized Water | 11.2 |
| Diisopropanol Amine | 5.8 |
| AMPS Monomer | 10.6 |
| Charge IV | |
| 2-(2-Butoxyethoxy)ethanol formal | 14.4 |
| Tertiary Butyl Perbenzoate | 10.2 |
| Charge V | |
| Deionized Water | 250.0 |
| Charge VI | |
| Diisopropanol Amine | 198.0 |
| Deionized Water | 1127.5 |

[1]Prepared as generally described in U.S. Pat. No. 4,891,111, column 3, lines 14 to 42.

The first portions of the DOWANOL PM, deionized water and the Formal (Charge I) were charged to a reaction vessel and heated to 100° C. under nitrogen. The styrene, methacrylic acid, butyl acrylate, hydroxyethyl acrylate, tertiary dodecyl mercaptan, second portion of Formal and first portion of tertiary butyl perbenzoate (Charge II) were charged to an erlenmeyer flask and mixed well. The second portions of DOWANOL PM and deionized water, the first portion of diisopropanol amine and AMPS monomer (Charge III) were charged to a second erlenmeyer flask and mixed well until all the AMPS monomer had dissolved. Both monomer mixtures were added dropwise as separate feeds to the hot DOWANOL PM, deionized water and Formal mixture in the reaction vessel over a three hour period while maintaining a gentle reflux.

Upon completion of the additions, the mixture in the reaction vessel had attained a temperature of 120° C. and was held for half an hour at that temperature. Half of a mixture of the second portion of tertiary butyl perbenzoate and the third portion of the Formal (Charge IV) was added dropwise over 5 minutes. Upon completion of the first scavanger addition, the reaction mixture was held at 120° to 125° C. for an hour. Likewise the second half of the scavanger was added over 5 minutes and the hour hold at 120° to 125° C. was repeated.

Upon completion of the scavanger holds, the third portion of deionized water (Charge V) was added dropwise to the mixture in the reaction vessel and the mixture reheated to 130° C. for an hour while 460 parts of distillate were collected. The mixture was then cooled to 90° C. and the second portion of diisopropanol amine (Charge VI) was added followed by the fourth portion of deionized water (Charge VII). The stripped, neutralized and diluted mixture was then cooled further to give a finished anionic acrylic grind vehicle ready for use as described below.

Pigment Grind Compositions

The following examples illustrate the preparation of various pigment grind compositions utilizing the acrylic grind vehicles of Examples A to C above.

Example I

This example illustrates the preparation of a pigment grind composition using the acrylic grind vehicle of Example A above. The pigment grind composition was prepared from a mixture of the following ingredients.

| Ingredients | Resin Solids (grams) | Pigment Solids grams) | Weight (grams) |
|---|---|---|---|
| Acrylic Grind Vehicle of Example A | 834.3 | | 834.3 |
| Diisopropanol Amine | | | 97.6 |
| Defoamer[1] | | | 9.1 |
| Deionized Water | | | 1896.2 |
| Titanium Dioxide[2] | | 1796.1 | 1796.1 |
| Clay[3] | | 218.4 | |
| Silica Flatting Agent[4] | | 72.8 | |
| Deionized water | | | 76.1 |
| Total | 834.3 | 2087.3 | 5000.0 |

[1]Commercially available as Foam Kill 639 from Crucible Chemicals
[2]Commercially available as TiPure R900 from E. I. DuPont de Nemours Co.
[3]Commercially available as ASP170 from Engelhard.
[4]Commercially available as Super Fine Super Floss from Strauch Chemical.

All ingredients were pre-mixed under agitation and ground for approximately one hour in a sand mill using zircoa ceramic beads as grind media until a 7+ Hegman grind was obtained. The resultant pigment dispersion had a total resin solids content of 16.7 percent and a total pigment solids content of 41.7 percent.

Example II

This example illustrates the preparation of a pigment grind composition using the acrylic grind vehicle of Example B above. The pigment grind composition was prepared from the mixture of the following ingredients.

| Ingredients | Resin Solids (grams) | Pigment Solids grams) | Weight (grams) |
| --- | --- | --- | --- |
| Acrylic Grind Vehicle of Example B | 913.1 | | 913.1 |
| Diisopropanol Amine | | | 16.8 |
| Defoamer[1] | 18.3 | | 36.5 |
| Deionized Water | | | 2195.1 |
| Titanium Dioxide[2] | | 1216.7 | 1216.7 |
| Clay[4] | | 551.6 | 551.6 |
| Carbon Black[5] | | 11.0 | 11.0 |
| Iron Oxide[6] | | 59.2 | 59.2 |
| Total | 931.4 | 1838.5 | 5000.0 |

[1]Commercially available as Surfynol GM from Air Products.
[2]Commercially available as TiPure R900 from E. I. DuPont de Nemours Co.
[3]Commercially available as ASP170 from Engelhard.
[4]Commercially available as Raven 1200 from Columbian Chemical.
[5]Commercially available as PS-1420M Bayferrox Yellow from Miles.

All ingredients were pre-mixed under agitation and ground for approximately one hour in a sand mill using zircoa ceramic beads as grind media until a 7+ Hegman grind was obtained. The resultant pigment dispersion had a total resin solids content of 18.6 percent and a total pigment solids content of 36.8 percent.

Example III

This example illustrates the preparation of a pigment grind composition using the acrylic grind vehicle of Example C above. The pigment grind composition was prepared from a mixture of the following ingredients.

| Ingredients | Resin Solids (grams) | Pigment Solids grams) | Weight (grams) |
| --- | --- | --- | --- |
| Acrylic Grind Vehicle of Example C | 556.3 | | 1112.5 |
| Diisopropanol Amine | | | 22.7 |
| Deionized Water | | | 1875.4 |
| Defoamer[1] | | | 94.9 |
| Clay[2] | | 568.5 | 568.5 |
| Titanium Dioxide[3] | | 1253.3 | 1253.3 |
| Carbon Black[4] | | 11.4 | 11.4 |
| Yellow Iron Oxide[5] | | 61.3 | 61.3 |
| Total | 556.3 | 1894.5 | 5000.0 |

[1]Commercially available as Surfynol GA from Air Products
[2]Commercially available as ASP170 from Engelhard
[3]Commercially available as TiPure R900 from E.I DuPont de Nemours Co.
[4]Commercially available as Printex 200 from Degussa
[5]Commercially available as PS-140M Bayferrox Yellow from Miles All ingredients were pre-mixed under agitation and ground for approximately one hour in a sand mill using zircoa ceramic beads as grind media until a 7+ Hegman grind was obtained. The resultant pigment dispersion had a total resin solids content of 11.1 percent and a total pigment solids content of 37.9 percent.

Example IV

This example illustrates the preparation of a pigment grind composition having a mixture of organic and inorganic pigments and using the acrylic grind vehicle of Example A above. The pigment grind composition was prepared from the mixture of the following ingredients.

| Ingredients | Resin Solids (grams) | Pigment Solids (grams) | Weight (grams) |
| --- | --- | --- | --- |
| Acrylic Grind Vehicle of Example A | 837.6 | | 837.6 |
| Diisopropanol Amine | | | 97.7 |
| Defoamer[1] | | | 24.4 |
| Deionized Water | | | 2233.7 |
| Organic Red Napthol[2] | | 566.9 | 566.9 |
| Organic Red Napthol[3] | | 340.6 | 340.6 |
| Yellow Iron Oxide[4] | | 743.4 | 743.4 |
| Titanium Dioxide[5] | | 155.7 | 155.7 |
| Total | 837.6 | 1796.6 | 5000.0 |

[1]Commercially available as Foam Kill 639 from Crucible Chemicals
[2]Commercially available as Novoperm Red 13-3059 from Hoescht Celanese
[3]Commercially available as Novoperm Red 13-3061 from Hoescht Celanese
[4]Commercially available as PS-1420M from Miles
[5]Commercially available as TiPure R900 from E. I. DuPont de Nemours Co.

All ingredients were pre-mixed under agitation and ground for approximately one hour in a sand mill using zircoa ceramic beads as grind media until a 7+ Hegman grind was obtained. The resultant pigment dispersion had a total resin solids content of 16.7 percent and a total pigment solids content of 35.9 percent.

The following examples V and VI illustrate the preparation of tint pastes with the acrylic grind vehicle of Example A above.

Example V

In this example a tint paste was prepared with transparent yellow iron oxide pigment from a mixture of the following ingredients:

| Ingredients | Resin Solids (grams) | Pigment Solids (grams) | Weight (grams) |
| --- | --- | --- | --- |
| Acrylic Grind Vehicle of Example A | 1108.8 | | 1108.8 |
| Diisopropanol Amine | | | 126.7 |
| Defoamer[1] | | | 15.8 |
| Deionized Water | | | 2639.9 |
| Transparent Yellow Iron Oxide[2] | 1108.8 | 1108.8 | 1108.8 |
| Total | 1108.8 | 1108.8 | 5000.0 |

[1]Commercially available as Foam Kill 639 from Crucible Chemicals
[2]Commercially available as Transparent Yellow Iron Oxide from Hilton Davies All ingredients were pre-mixed under agitation and ground for approximately one hour in a sand mill using zircoa ceramic beads as grind media until a 7+ Hegman grind was obtained. The resultant pigment dispersion had a total resin solids content of 22.2 percent and a total pigment solids content of 22.2 percent.

Example VI

In this example a tint paste was prepared with transparent red iron oxide pigment from a mixture of the following ingredients.

| Ingredients | Resin Solids (grams) | Pigment Solids (grams) | Weight (grams) |
|---|---|---|---|
| Acrylic Grind Vehicle of Example A | 674.8 | | 674.8 |
| Diisopropanol Amine | | | 117.6 |
| Defoamer[1] | | | 6.7 |
| Deionized Water | | | 2243.3 |
| Transparent Red Iron Oxide[2] | | 1957.6 | 1957.6 |
| Total | 674.8 | 1957.6 | 5000.0 |

[1] Commercially available as Foam Kill 639 from Crucible Chemicals
[2] Commercially available as Red Iron Oxide PQR 9259 from Miles All ingredients were pre-mixed under agitation and ground for approximately one hour in a sand mill using zircoa ceramic beads as grind media until a 7+ Hegman grind was obtained. The resultant pigment dispersion had a total resin solids content of 14.0 percent and a total pigment solids content of 40.2 percent.

What is claimed is:

1. A pigment grind composition having a volatile organic content (VOC) of less than 2 pounds per gallon comprising a pigment, a water-dispersible acrylic polymer, water, and a reactive diluent having a number average molecular weight of between about 200 and about 2500 comprising polyalkylene glycol mono esters formed by the reaction of polyalkylene glycol with a monocarboxylic acid having between eight and eighteen carbon atoms, and mixtures thereof.

2. The pigment grind composition of claim 1 wherein the reactive diluent has a number average molecular weight ranging from about 250 to about 1000.

3. The pigment grind composition of claim 2 wherein the reactive diluent has a number average molecular weight ranging from about 300 to about 800.

4. The pigment grind composition of claim 1 wherein the reactive diluent is a polyalkylene glycol ester and is selected from the group consisting of polyethylene glycol esters and polypropylene glycol esters.

5. The pigment grind composition of claim 1 wherein the monocarboxylic acid is selected from the group consisting of caprylic, capric, lauric, myristic, palmitic, stearic, oleic, linoleic, and linolenic acid.

6. The pigment grind composition of claim 5 where the polyalkylene glycol ester is polyethylene glycol monolaurate.

7. The pigment grind composition of claim 1 wherein the acrylic polymer is the polymerization product of a vinyl monomer component comprising a monomer or mixture of monomers selected from the group consisting of alkyl acrylates, alkyl methacrylates, hydroxyl functional acrylates, hydroxyl functional methacrylates, vinyl aromatics, acrylic acid, and methacrylic acid.

8. The pigment grind composition of claim 7 wherein the vinyl monomer component comprises a vinyl aromatic monomer which is styrene, an alkyl acrylate which is butyl acrylate, a hydroxyl functional acrylate which is hydroxy ethyl acrylate, and methacrylic acid.

9. The pigment grind composition of claim 8 wherein the vinyl monomer component comprises from about 15 to about 35 percent vinyl aromatic monomer, from about 40 to about 60 percent alkyl acrylate, from about 5 to about 20 percent hydroxyl functional acrylate and from about 8 to about 15 percent methacrylic acid.

10. The pigment grind composition of claim 1 wherein the volatile organic content is less than 1.5 pounds per gallon.

11. The pigment grind composition of claim 10 wherein the volatile organic content is less than 1.0 pounds per gallon.

12. The pigment grind composition of claim 11 wherein the volatile organic content is less than 0.5 pounds per gallon.

13. The pigment grind composition of claim 1 wherein the pigment is an organic pigment.

14. The pigment grind composition of claim 1 wherein the pigment is an inorganic pigment.

15. The pigment grind composition of claim 1 wherein the pigment is a mixture of organic and inorganic pigments.

16. The pigment grind composition of claim 1 wherein the composition is compatible with electrodeposition.

17. The pigment grind composition of claim 1 wherein the weight ratio of pigment to binder, based on the sum of acrylic polymer and reactive diluent, is at least 1:1.

* * * * *